United States Patent [19]
Burba, III et al.

[11] Patent Number: 5,658,859
[45] Date of Patent: Aug. 19, 1997

[54] PSEUDOPLASTIC MIXED METAL LAYERED HYDROXIDE FLUID WITH FLUID LOSS ADDITIVE AND METHOD OF USE IN PENETRATING THE EARTH

[75] Inventors: John L. Burba, III, Lake Johnson; Lindsay J. Fraser, Katy, both of Tex.

[73] Assignee: Dowell Schlumberger Incorporated, Sugar Land, Tex.

[21] Appl. No.: 594,108

[22] Filed: Jan. 30, 1996

Related U.S. Application Data

[63] Continuation of Ser. No. 23,128, Mar. 1, 1993, abandoned, which is a continuation-in-part of Ser. No. 662,264, Feb. 28, 1991, abandoned.

[51] Int. Cl.$^6$ ............................................. C09K 7/02
[52] U.S. Cl. .......................... 507/111; 507/113; 507/140; 507/903
[58] Field of Search ................................ 507/111, 113, 507/140, 903

[56] References Cited

U.S. PATENT DOCUMENTS

| | | | |
|---|---|---|---|
| 4,310,425 | 1/1982 | Key et al. | 507/113 |
| 4,427,556 | 1/1984 | Hoose et al. | 507/113 |
| 4,428,843 | 1/1984 | Cowan et al. | 507/113 |
| 4,664,818 | 5/1987 | Halliday et al. | 507/113 |
| 4,664,843 | 5/1987 | Burba, III et al. | 252/315.5 |
| 4,790,954 | 12/1988 | Burba, III et al. | 252/315.5 |
| 4,990,268 | 2/1991 | Burba, III et al. | 507/140 |

*Primary Examiner*—Philip Tucker
*Attorney, Agent, or Firm*—John E. Vick, Jr.

[57] ABSTRACT

The present invention relates to a pseudoplastic fluid composition including water, a mixed metal layered hydroxide dispersed in the water to impart preselected rheological properties to the fluid and a fluid loss additive composition including one or more of a carboxymethyl substituted vegetable starch, a carboxymethylated cellulosic compound or mixtures thereof in an amount effective to inhibit loss of fluid and with the degree of substitution being selected so that the carboxymethyl substituted compound is soluble in the fluid at the concentration of use without materially adversely affecting the rheological properties of the fluid and so that the fluid is resistant to fermentation. The improved composition includes a crosslinked carboxymethylated vegetable starch which has a degree of substitution in the broad range from about 0.3 to about 0.8 and in a narrower range of about 0.4 to about 0.7 and an uncrosslinked carboxymethylated vegetable starch or a carboxymethylated cellulosic which has a degree of substitution in the broad range from about 0.3 to about 0.57 and in a narrower range from about 0.4 to about 0.5. The drilling method includes drilling while circulating the drilling fluid with the improved composition therein.

28 Claims, No Drawings

PSEUDOPLASTIC MIXED METAL LAYERED HYDROXIDE FLUID WITH FLUID LOSS ADDITIVE AND METHOD OF USE IN PENETRATING THE EARTH

CROSS REFERENCE TO RELATED APPLICATIONS

This is a continuation of application Ser. No. 08/023,128 filed Mar. 1, 1993 now abandoned which is a continuation-in-part application of the prior application Ser. No. 07/662,264, filed Feb. 28, 1991 now abandoned.

BACKGROUND

The present invention relates to an improved fluid loss control additive composition which is particularly useful with drilling fluids which contain one or more mixed metal layered hydroxide compounds. Here after the term "drilling fluid" shall be taken to refer specifically to fluids containing at least one mixed metal layered hydroxide compound. Such drilling fluids may also contain a variety of commonly used chemicals such as, but not limited to, weighting agents, defoamers, shale inhibitors, corrosion inhibitors, and the like.

The use of mixed metal hydroxide materials as gelling agents in drilling fluids is known from the prior art, J. L. Burba et al U.S. Pat. Nos. 4,664,843 and 4,790,954, the teachings of which are expressly incorporated herein.

The Burba et al patents disclose a new and useful material composition for use in drilling fluids. However, when they are used in drilling situations requiring a fluid loss control additive, difficulties may be encountered. For example, the use of certain carboxymethyl cellulosic polymers causes somewhat detrimental effects on the rheology of the drilling fluid, e.g., lower shear viscosity resulting in decreased solids transporting capacity. Commonly available unsubstituted starches which are used regularly in conventional drilling fluids are compatible. They are, however, only partially effective, and ferment readily in aqueous suspensions of bentonite clays containing mixed metal layered hydroxides.

SUMMARY

The present invention provides an improved composition for a drilling fluid and an improved method of drilling which utilizes such improved composition. The present invention provides a method of achieving filtration control in the drilling fluid without substantially altering the desirable rheological characteristics of such fluids.

The present invention is a carboxymethylated starch or carboxymethylated cellulosic having a controlled degree of substitution. Such materials have particular application in drilling fluids. The preferred composition of the improved fluid loss control additive includes carboxymethylated starch, which does not cause settling of the weight material and does not change the rheology of the drilling fluid beyond acceptable limits.

The particular fluid loss control additives which can be used in the improved composition of the present invention include carboxymethylated starches where the starch source may be a crosslinked vegetable starch, such as potato, rice, corn, maize, or other starch containing products or carboxymethyl cellulose or an uncrosslinked vegetable starch as set forth above and where the crosslinked vegetable starch has a degree of substitution in the broad range of about 0.3 to about 0.8 and preferably in the narrow range of about 0.4 to about 0.7; and where the uncrosslinked vegetable starch and the carboxymethylcellulose have a degree of substitution in the broad range of about 0.3 to 0.57 and preferably in the narrow range of about 0.3 to 0.4. As used herein, the term "uncrosslinked" is intended to mean that the material is substantially free of crosslinking. The starches may be crosslinked or not as desired. Such compositions are suitable for aqueous based drilling fluids since they do not readily ferment and do not change, to an unacceptable degree, the rheology of the drilling fluid.

An object of the present invention is to provide an improved composition to be used with a drilling fluid to achieve filtration control in the drilling fluid without substantially altering the desirable rheological characteristics of the drilling fluid.

Another object is to provide an improved drilling fluid which includes mixed metal layered hydroxide compounds and a fluid loss control additive which does not change the rheological characteristics of the drilling fluid.

Still another object is to provide an improved method of drilling a well with a drilling fluid including the improved composition of the present invention which has mixed metal layered hydroxides and filtration control.

Another object is to provide an improved fluid loss additive for use in a fluid including layered mixed metal hydroxides.

A further object of this invention is to provide a drilling fluid containing at least one mixed metal layered hydroxide and a fluid loss additive, which fluid can be recovered, stored and/or transported to another well site and reused at a later date.

The use of the mixed metal layered hydroxides in combination with drilling fluid chemicals has been found to be advantageous. One difficulty which has been experienced is that strongly anionic fluid loss control agents cause deleterious effects on fluid rheology in these systems. Some additives such as unsubstituted starches can be utilized and do not significantly alter rheology. However, fermentation can occur causing high filtrate loss rates.

DESCRIPTION OF THE PREFERRED EMBODIMENTS

It has been discovered that fluid loss control additives which are within a specified range of composition may be used without deleterious effects on the fluid rheology and without resulting in substantial fermentation. Carboxymethylated starches and carboxymethyl cellulosics may be used provided their properties fall within the limits herein specified. The controlling factors in maintaining these properties are the degree of substitution of the fluid loss control additive and whether the fluid loss control additive is crosslinked. In using crosslinked vegetable starches the degree of substitution is maintained within a range from about 0.3 to about 0.8, the rheological characteristics and fermentation resistance are maintained. In using uncrosslinked vegetable starches and carboxymethyl cellulosics, the degree of substitution should be maintained within the range of about 0.3 to about 0.57. It is further preferred that in situations where there is any doubt, the range may be narrowed to about 0.4 to about 0.7 for cross linked vegetable starches and to about 0.4 to about 0.5 for uncrosslinked vegetable starches and carboxymethyl cellulosics to ensure that the rate of filtration loss and the rheology of the drilling fluid are maintained within the desired limits.

Rheological measurements were made in accordance with API-RP-13B-1 section 2 and filtrate loss rate measurements were made in accordance with API-RP-13B-1 section 3.

Mixed metal layered hydroxide based drilling fluids containing unsubstituted starches as fluid loss control additives, in the absence of biocides, exhibited desirable viscosity readings initially and after a period of more than three weeks. However, over that period of time, fermentation was observed and filtrate loss rates increased from 6 ml/30 min. to greater than 70 ml/30 min.

Drilling fluids containing the improved composition of the present invention displayed desirable rheology over a three week test period and the filtrate loss rates, which were initially 6.6 ml/30 min. remained essentially constant (less than about 10ml/30 min) throughout the three week period.

The preferred composition was a cross linked carboxymethylated starch which had a degree of substitution, as calculated by the ASTM Designation: D 1439-83a, of 0.57.

The determination of the desired ranges of substitution to be used in the carboxymethylation of the fluid loss control additive material is a balance of the disadvantages between the change of the rheology and the onset of fermentation in the case of starches and solubility in the case of cellulosics.

Spot tests conducted have shown that as the degree of substitution in the carboxymethylation of the crosslinked starch is increased the amount of fermentation is reduced drastically, but the rheology of the drilling fluid will deteriorate also. By plotting the two curves the range which is acceptable to the particular application of the drilling fluid can be determined. For example, if an API fluid loss below 10 is acceptable, then in one particular test, the degree of substitution of the fluid loss control additive composition must be 0.50 or above and if the rheology (e.g. the viscosity reading at 3 and 6 rpm on the Fann Viscometer) above 10 is acceptable (with all other rheology factors taken into consideration) then in another test run jointly with the test mentioned above, the degree of substitution of the fluid loss control additive composition should be less than 0.70. In the determination of this degree of substitution all of the factors in the rheology of the drilling fluid after the addition of the fluid loss control additive are taken into consideration together with the potential for fermentation of the drilling fluid. Since it is the fermentation of the fluid loss additive composition that results in the substantial increase in the API fluid loss factor, the range of degree of substitution may be broadened by the inclusion of a small amount of a common bactericide such as paraformaldehyde, carbamates, isothiazoline, and other biocides. A similar result has been found with the uncrosslinked vegetable starches and carboxymethyl cellulosics in the ranges set out herein.

A fluid loss control additive material, such as a crosslinked vegetable starch (e.g. potato, corn, rice, maize, and the like) having a degree of carboxymethylation in the range of about 0.4 to about 0.7 is believed to be the optimum and for uncrosslinked vegetable starches and carboxymethyl cellulosic having a degree of carboxymethylation in the range of about 0.3 to about 0.57 is believed to be the optimum and preferred composition for a fluid loss control additive to be used with a mixed metal layered hydroxide based drilling fluid.

The improved drilling method includes the steps of operating a drill bit to cause penetration into the earth to form a well bore and circulating in the well bore a drilling fluid containing at least one mixed metal layered hydroxide and the fluid loss control additive composition of the present invention.

The following examples are to illustrate certain embodiments, but the invention is not limited to the particular embodiments shown. Those skilled in the art will recognize that the quantities of each component may be changed to meet immediate operational needs even as a drilling operation proceeds through different strata and subterranean conditions, and that other chemicals such as, but not limited to NaOH for pH control and $BaSO_4$ for density control may be added to the system. In expressing a metric equivalent, the following U.S. to metric conversion factors are used:

1 gal=3.785 liters
1 lb=0.454 kg
1 lb/gal=119.83 kg/m$^3$
1 bbl=42 gal
1 lb/bbl=2.835 kg/m$^3$

EXAMPLE 1

An aqueous drilling fluid illustrating the use of a crosslinked carboxymethylated vegetable starch in fresh water is prepared by the following procedure.

API grade sodium bentonite is dispersed into fresh water at a concentration of 7 lb per 42 gallon barrel (20 kg/m$^3$). The clay is allowed to hydrate for 8 to 24 hours. Mixed metal layered hydroxide powder, comprised of monolayer magnesium aluminum hydroxy chloride (having an empirical formula of $MgAl(OH)_{4.7}Cl_{0.3}$), glycerine and water, is dispersed in a small quantity of water. It is then dispersed into the clay mixture in a concentration of 0.7 lb powder per barrel (2 kg/m$^3$) with agitation. This mixture is then blended into the clay slurry to form a drilling fluid base of an aqueous reaction product of the mineral clay with the mixed metal layered hydroxide.

Crosslinked carboxymethylated potato starch, having a degree of substitution of 0.56, is added to the mixture at a level of about 2 lb per barrel (5.7 kg/m$^3$).

The resulting fluid has rheological properties that are adequate to clean highly deviated well bores (greater than 45° deviation from vertical), and suspend solids, while maintaining filtrate loss rates under 10 ml/30 min.

EXAMPLE 2

An aqueous drilling fluid illustrating the use of a cellulosic fluid loss additive in fresh water is prepared by the procedure set forth in Example 1, except that in lieu of the starch, crosslinked carboxymethylated cellulose having a degree of substitution of 0.7 is added to the mixture at a concentration of about 2 lb per barrel (5.7 kg/m$^3$).

The resulting fluid has reasonable rheological properties. However, the fluid will not perform as well as the fluid in the previous example. Filtrate loss rates will be less than 10 ml/30 min.

EXAMPLE 3

An aqueous drilling fluid illustrating the use of a carboxymethylated vegetable starch in sea water is prepared by the following proceeding.

After hydration in fresh water, API grade sodium bentonite is dispersed into sea water at a concentration of 10 lb per 42 gallon barrel, (28.5 kg/m$^3$). Mixed metal layered hydroxide powder, as described in Example 1, is dispersed in a small quantity of water for several minutes. It is then mixed into the dispersed clay at a level of 1.0 lb powder per bbl (2.853 kg/m$^3$) with agitation. This mixture is then blended into the clay slurry.

Crosslinked carboxymethylated potato starch, having a degree of substitution of 0.56, is added to the mixture at a level of about 3 lb per barrel.

The resulting fluid has rheological properties that are adequate to clean highly deviated holes, and suspend solids, while maintaining filtrate loss rates under 10 ml/30 min.

EXAMPLE 4

An aqueous drilling fluid illustrating the use of a carboxymethylated cellulosic compound in sea water is prepared by the procedure of Example 3, except that in lieu of the starch compound, crosslinked carboxymethylated cellulose having a degree of substitution of 0.7 is added to the mixture at a level of about 3 lb per barrel (8.6 kg/m$^3$).

The resulting fluid has reasonable rheological properties. However, the fluid will not perform as well as the fluid in the previous example. Filtrate loss rates will be less than 10 ml/30 min.

EXAMPLE 5

EFFECTS OF CARBOXYMETHYLCELLULOSE ON MMH FLUIDS

A drilling fluid composition was prepared by prehydrating 10 lb/bbl of sodium bentonite in fresh water for 2 hrs. 1 lb/bbl of MMH is added and the mixture is sheared for 15 minutes with a Hamilton Beach Mixer. The fluid pH was adjusted to 9.5 with NaOH. The following Fann rheology numbers were recorded for this fluid.

| Fann Viscometer Date for Base Fluid | |
| --- | --- |
| Instrument Speed | Dial Reading |
| 600 | 65 |
| 300 | 58 |
| 200 | 55 |
| 100 | 50 |
| 6 | 33 |
| 3 | 31 |
| 10 sec gel | 29 |
| 10 min gel | 28 |
| Plastic Viscosity | 7 |
| Yield Point | 51 |
| API Fluid Loss | 45 cc |

To this fluid, 1 lb/bbl low molecular weight carboxymethylcellulose (acid number=0.75) was added and the fluid was mixed for 15 minutes. Again, the rheology is measured.

| Fann Viscometer Data for Base Fluid + CMC | |
| --- | --- |
| Instrument Speed | Dial Reading |
| 600 | 35 |
| 300 | 22 |
| 200 | 15 |
| 100 | 11 |
| 6 | 4 |
| 3 | 3 |
| 10 sec gel | 8 |
| 10 min gel | 15 |
| Plastic Viscosity | 13 |
| Yield Point | 9 |
| API Fluid Loss | 6 cc |

While the rheology of the second fluid is sufficient for many drilling operations, critically difficult applications such as high angle and horizontal wells or milling operations require substantially higher 6 and 3 rpm values.

EXAMPLE 6

Fluid Loss Control with Starch

To the base fluid described in Example 5, 4 lb/bb. of potato starch is added.

| Fann Viscometer Data for Base Fluid + potato starch | |
| --- | --- |
| Instrument Speed | Dial Reading |
| 600 | 70 |
| 300 | 66 |
| 200 | 58 |
| 100 | 53 |
| 6 | 35 |
| 3 | 28 |
| 10 sec gel | 30 |
| 10 min gel | 32 |
| Plastic Viscosity | 4 |
| Yield Point | 62 |
| API Fluid Loss | 7 cc |

The problem is that this fluid ferments easily, requiring the use of biocides.

EXAMPLE 7

Starch with a High Level of Carboxymethylation

The base fluid is treated with 4 lb/bbl of potato starch, having a degree of substitution of about 0.75. This level of treatment is sufficient to eliminate fermentation problems. However, it causes detrimental effects on rheology as demonstrated below.

| Fann Viscometer Data for Base Fluid | |
| --- | --- |
| Instrument Speed | Dial Reading |
| 600 | 80 |
| 300 | 55 |
| 200 | 45 |
| 100 | 32 |
| 6 | 13 |
| 3 | 11 |
| 10 sec gel | 10 |
| 10 min gel | 41 |
| Plastic Viscosity | 25 |
| Yield Point | 630 |
| API Fluid Loss | 6 cc |

As with the fluid loss control agent in Example 5, low shear rate values are adversely effected.

EXAMPLE 8

Varying Degrees of Substitution

Five fluids were prepares by adding 6 bl/bbl each of starch having varying degrees of carboxymethyl substitution. The fluids were contaminated with bacteria and stored in a warm dark location for about two weeks. They were then tested for API fluid loss and the 6 rpm dial reading of the Fann viscometer. This low shear reading is an excellent predictor of solids suspension capability of MMH fluids.

Substantial odor developed in the fluid containing starch with zero substitution. Low degrees of substitution produced starches which easily ferment and provide high API fluid loss values. This is undesirable. Higher degrees of substitution avoid fermentation and produce lower API values, which is desirable. However, if the degree of substitution is too high, the 6 rpm values are detrimentally effected.

What is claimed is:

1. A pseudoplastic fluid composition comprising
(a) water;
(b) at least one mixed metal layered hydroxide dispersed in the water in an amount effective to impart preselected rheological properties; and (c) at least one carboxymethyl substituted vegetable starch, in an amount effective to inhibit loss of fluid from the composition to a porous environment, the degree of substitution being preselected so that the carboxymethyl substituted vegetable starch is (1) soluble in the fluid composition at the concentration of use without materially adversely affecting rheological properties of the fluid composition and (2) the fluid composition is resistant to fermentation.

2. The pseudoplastic fluid of claim 1 wherein the carboxymethyl substituted vegetable starch is selected from the group consisting of
(a) carboxymethyl substituted vegetable starch substantially free of crosslinking having a degree of substitution of from about 0.3 to about 0.57,
(b) crosslinked carboxymethyl substituted vegetable starch having a degree of substitution of from about 0.3 to about 0.8,
(c) mixtures of (a) and (b).

3. A drilling fluid comprising
(a) an aqueous suspension of an adduct or reaction product of a least one mineral clay with at least one mixed metal layered hydroxide, in an amount effective to impart preselected rheological properties to the fluid; and
(b) at least one fluid loss additive selected from
(1) carboxymethyl substituted vegetable starch substantially free of crosslinking having a degree of substitution of from about 0.3 to about 0.57,
(2) crosslinked carboxymethyl substituted vegetable starch having a degree of substitution of from about 0.3 to about 0.8, and
(3) mixtures thereof;
in an amount effective to inhibit loss of fluid from the composition to a porous environment.

4. The drilling fluid of claim 3 wherein the degree of carboxymethyl substitution is from about 0.4 to about 0.5 for the substituted vegetable starch substantially free of crosslinking and from about 0.4 to about 0.7 for the crosslinked carboxymethyl substituted vegetable starch.

5. The drilling fluid of claim 3 wherein the carboxymethyl substituted vegetable starch, crosslinked or substantially free of crosslinking, is selected from carboxymethylated potato starch, carboxymethylated corn starch, carboxymethylated rice starch, and carboxymethylated maize starch, and mixtures thereof.

6. The drilling fluid of claim 4 wherein the carboxymethyl substituted vegetable starch is substantially free of crosslinking, and the aqueous suspension comprises sea water.

7. The drilling fluid of claim 4 wherein the carboxymethyl substituted vegetable starch is crosslinked, and the aqueous suspension comprises sea water.

8. The drilling fluid of claim 7 wherein the crosslinked carboxymethyl substituted vegetable starch is selected from carboxymethylated potato starch, carboxymethylated corn starch, carboxymethylated rice starch, carboxymethylated maize starch, and a mixture thereof.

9. The drilling fluid of claim 3 wherein
the clay is sodium bentonite;
the mixed metal layered hydroxide includes glycerine or polyglycol in an amount sufficient to aid in dispersing the particulate mixed metal layered hydroxide in water; the mixed metal layered hydroxide corresponds to the formula

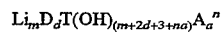

where
m is an amount of Li in the range of 0 to about 1
D is a divalent metal ion, and d is an amount of D in the range of zero to about 4;
T is a trivalent metal ion;
A represents monovalent or polyvalent anions of valence −n, with a being the amount of A anions;
(m+d) is greater than zero and (m+2d+3+na) is equal to or greater than 3;
the degree of carboxymethyl substitution in the fluid loss additive is from about 0.4 to about 0.5 for the substituted vegetable starch substantially free of crosslinking, and from about 0.4 to about 0.7 for the crosslinked carboxymethyl substituted vegetable starch; and
the drilling fluid contains a bactericidal amount of paraformaldehyde, a carbamate bactericide, isothiazoline, or a mixture thereof.

10. The drilling fluid of claim 9 wherein the fluid loss additive is a least one crosslinked carboxymethylated potato starch, crosslinked carboxymethylated corn starch, crosslinked carboxymethylated rice starch, or crosslinked carboxymethylated maize starch.

11. The drilling fluid of claim 3 wherein
the clay is sodium bentonite;
the mixed metal layered hydroxide includes glycerine or polyglycol in an amount sufficient to aid in dispersing the particulate mixed metal layered hydroxide in water; and the mixed metal layered hydroxide corresponds to the formula

where
m is an amount of Li in the range of 0 to about 1
D is a divalent metal ion, and d is an amount of D in the range of zero to about 4;
T is a trivalent metal ion;
A represents monovalent or polyvalent anions of valence −n, with a being the amount of A anions;
(m+d) is greater than zero and (m+2d+3+na) is equal to or greater than 3.

12. The drilling fluid of claim 11 wherein the degree of carboxymethyl substitution is from about 0.4 to about 0.5 for the substituted vegetable starch substantially free of crosslinking and from about 0.4 to about 0.7 for the crosslinked carboxymethyl substituted vegetable starch.

13. The drilling fluid of claim 12 wherein the fluid loss additive is crosslinked and selected from carboxymethylated potato starch, carboxymethylated corn starch, carboxymethylated rice starch, carboxymethylated maize starch, or a mixture of two or more thereof.

14. The drilling fluid of claim 3 comprising bacteria.

15. A method of preparing a drilling fluid comprising
(a) dispersing at least one mineral clay into an agitated aqueous fluid to form a first dispersion;
(b) permitting the clay to hydrate in the first dispersion;
(c) reacting at least one mixed metal layered hydroxide with the hydrated clay to form a drilling fluid base of an aqueous reaction product of the mineral clay with the mixed metal layered hydroxide; and (d) dispersing into the drilling fluid base at least one fluid loss additive selected from
  (1) carboxymethyl substituted vegetable starch substantially free of crosslinking having a degree of substitution of from about 0.3 to about 0.57;
  (2) crosslinked carboxymethyl substituted vegetable starch having a degree of substitution of from about 0.3 to about 0.8; and
  (3) a mixture thereof;
in an amount effective to impart preselected fluid loss properties to the drilling fluid base.

16. The method of claim 15 wherein step (c) is carried out by
  (i) dispersing at least one mixed metal layered hydroxide in particulate form into an aqueous fluid, separate from the first dispersion formed in step (a);
  (ii) permitting the dispersed mixed metal layered hydroxide to hydrate; and
  (iii) admixing the hydrated mixed metal layered hydroxide dispersion with the hydrated clay first dispersion to form a drilling fluid base of an aqueous reaction product of the mineral clay with the mixed metal layered hydroxide.

17. The method of claim 16 wherein the particulate mixed metal layered hydroxide includes at least one hydrophilic organic compound in an amount sufficient to aid in dispersing the particulate mixed metal layered hydroxide in water.

18. The method of claim 17 wherein the degree of carboxymethyl substitution is from about 0.4 to about 0.5 for the substituted vegetable starch substantially free of crosslinking and from about 0.4 to about 0.7 for the crosslinked carboxymethyl substituted vegetable starch.

19. A method of penetrating the earth comprising
  (a) operating a drill bit to cause penetration of the earth to form a borehole, and
  (b) circulating into the borehole a drilling fluid including
    (a) an aqueous suspension of an adduct or reaction product of at least one mineral clay with a least one mixed metal layered hydroxide, in an amount effective to impart preselected rheological properties; and
    (b) at least one fluid loss additive selected from
      (1) carboxymethyl substituted vegetable starch substantially free of crosslinking having a degree of substitution of from about 0.3 to about 0.57;
      (2) crosslinked carboxymethyl substituted vegetable starch having a degree of substitution of from about 0.3 to about 0.8; and
      (3) mixtures thereof;
    in an amount effective to inhibit loss of fluid from the composition to a porous environment.

20. A pseudoplastic fluid composition comprising
  (a) water;
  (b) at least one mixed metal layered hydroxide dispersed in the water in an amount effective to impart preselected rheological properties; and
  (c) a mixture of a carboxymethyl substituted vegetable starch and a carboxymethylated cellulosic compound in an amount effective to inhibit loss of fluid from the composition to a porous environment, the degree of substitution being preselected so that (1) the mixture is soluble in the fluid composition at the concentration of use without materially adversely affecting rheological properties of the fluid composition and (2) the fluid composition is resistant to fermentation.

21. The pseudoplastic fluid of claim 20 wherein the carboxymethyl substituted cellulosic compound is selected from the group consisting of
  (1) carboxymethylated cellulosic compound having a degree of substitution of from about 0.4 to 0.57, and
  (2) mixtures thereof.

22. A drilling fluid comprising
  (a) an aqueous suspension of an adduct or reaction product of at least one mineral clay with a least one mixed metal layered hydroxide, in an amount effective to impart preselected rheological properties; and
  (b) a mixture of a carboxymethyl substituted vegetable starch and a carboxymethylated cellulosic compound in an amount effective to inhibit loss of fluid from the composition to a porous environment, the degree of carboxymethyl substitution being from about 0.4 to about 0.8.

23. The drilling fluid of claim 22 wherein the clay is sodium bentonite;

the mixed metal layered hydroxide includes glycerine or polyglycol in an amount sufficient to aid in dispersing the particulate mixed metal layered hydroxide in water, and the mixed metal layered hydroxide corresponds to the formula

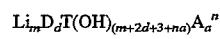

where
m is an amount of Li in the range of 0 to about 1
D is a divalent metal ion, and d is an amount of D in the range of zero to about 4;
T is a trivalent metal ion;
A represents monovalent or polyvalent anions of valence −n, with a being the amount of A anions;
(m+d) is greater than zero and (m+2d+3+na) is equal to or greater than 3,
and the drilling fluid contains a bactericidal amount of paraformaldehyde, a carbamate bactericide, isothiazoline, or a mixture thereof.

24. A method of preparing a drilling fluid comprising
  (a) dispersing at least one mineral clay into an agitated aqueous fluid to form a first dispersion;
  (b) permitting the clay to hydrate in the first dispersion;
  (c) reacting at least one mixed metal layered hydroxide with the hydrated clay to form a drilling fluid base of an aqueous reaction product of the mineral clay with the mixed metal layered hydroxide; and
  (d) dispersing into the drilling fluid base a mixture of a carboxymethyl substituted vegetable starch and a carboxymethylated cellulosic compound in an amount effective to inhibit loss of fluid from the composition to a porous environment, the degree of carboxymethyl substitution being from about 0.3 to 0.8.

25. The method of claim 24 wherein step (c) is carried out by
  (i) dispersing at least one mixed metal layered hydroxide in particulate form into an aqueous fluid, separate from the first dispersion formed in step (a);
  (ii) permitting the dispersed mixed metal layered hydroxide to hydrate; and
  (iii) admixing the hydrated mixed metal layered hydroxide dispersion with the hydrated clay first dispersion to form a drilling fluid base of an aqueous reaction product of the mineral clay with the mixed metal layered hydroxide.

26. The method of claim 24 wherein the particulate mixed metal layered hydroxide includes at least one hydrophilic organic compound in an amount sufficient to aid in dispersing the particulate mixed metal layered hydroxide in water.

27. The method of claim 26 wherein the degree of carboxymethyl substitution is from about 0.4 to about 0.57.

28. A method of penetrating the earth comprising the steps of
  (a) operating a drill bit to cause penetration of the earth to form a borehole, and
  (b) circulating into the borehole a drilling fluid including
    (a) an aqueous suspension of an adduct or reaction product of at least one mineral clay with at least one metal layered hydroxide, in an amount effective to impart preselected rheological properties; and
    (b) a mixture of a carboxymethyl substituted vegetable starch and a carboxymethylated cellulosic compound in an amount effective to inhibit loss of fluid from the composition to a porous environment, the degree of substitution being from about 0.4 to about 0.57.

* * * * *